UNITED STATES PATENT OFFICE 2,348,121

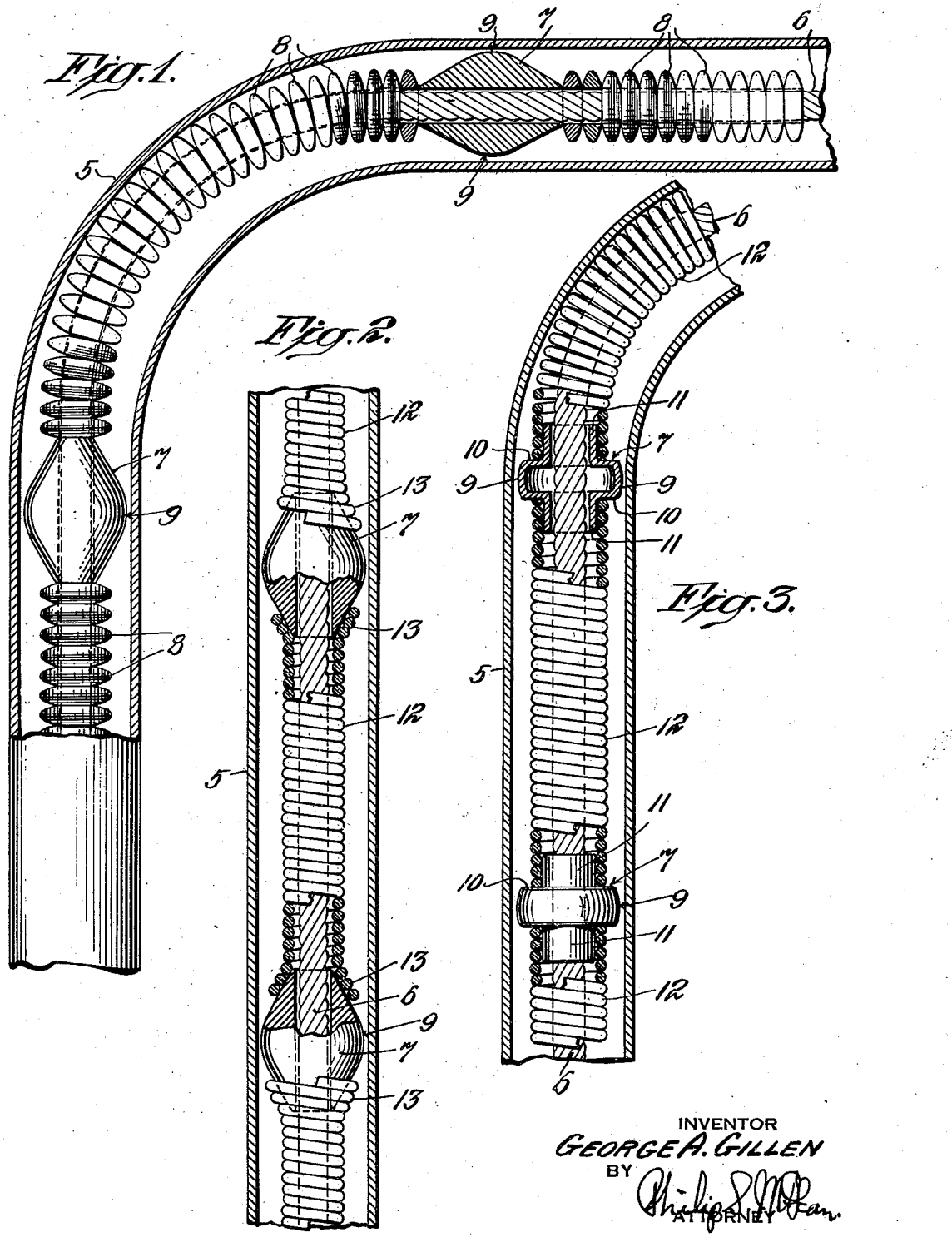

FLEXIBLE PUSH-PULL CONTROL

George A. Gillen, Bronx, N. Y., assignor to The Connecticut Electric Manufacturing Co., Bantam, Conn., a corporation of Connecticut Application February 20, 1943, Serial No. 476,611

1 Claim. (Cl. 74—501)

The invention here disclosed relates to flexible connections for effecting push and pull control movements.

Special objects of the invention are to provide a control connection for transmission of tension or compression loads, sufficiently flexible and of low friction ratio to carry such loads around relatively sharp corners without binding, and so constructed as to avoid abrasion or pinching tendencies on the cable constituting the tension element and forming the core of the connection.

Other objects of the invention are to provide a flexible two-way control of the above characteristics, which will be of simple construction, readily assembled and installed, adaptable to various conditions and many uses and which will be fully reliable and effective in every way.

Additional objects and the novel features of invention through which all objects are attained, will appear or are definitely set forth in the following specification.

The drawing accompanying and forming part of the specification illustrates a number of the present practical embodiments of the invention. The actual physical structure, however, may be further modified and changed all within the true intent and broad scope of the invention, as hereinafter defined and claimed.

Fig. 1 in the drawing is a broken part sectional view illustrating one embodiment of the invention.

Figs. 2 and 3 are similar views, illustrating other forms of the invention.

As shown in the several views, the invention comprises a guiding and supporting tube 5, a pull cable 6, operating in such tube, bearings 7, on the cable, in spaced relation and designed to slidingly engage the inner surface of the tube and lenticular spacing elements 8, on the cable, between the bearings.

In Figs. 1 and 2, the bearing elements are shown as conically extended spheroidal members having rounded exteriors for smoothly riding the inner surface of the conduit tube.

In the third form of the invention, Fig. 3, the bearing elements 7, while having externally spheroidal surfaces 9, at their greatest diameter, are reduced immediately adjoining such surfaces to provide abrupt end shoulders 10, and are extended from such shoulders to form substantially cylindrical hubs 11.

The lenticular form of spacing structure between the bearings may be varied.

In the first type of the invention illustrated, the lenticular spacing elements are circular, double convex buttons or washers in abutting side-by-side relation on the cable, between the bearings, and these buttons, like the bearings, are loosely strung on the cable, so that by means of end abutments applied to the cable, all these elements may be compressibly held on the cable, thus to enable transmission of thrust as well as tension loads.

The lenticular structure provides a bendable spacer between the bearings, enabling operation around relatively sharp angles and while the bearing elements may normally provide all necessary bearing engagement between the flexible connection and the enclosing tube, in some circumstances, the edges of the lenticular elements may, at points, ride the confining walls of the tubing, after the manner indicated in Fig. 1.

The tubular bearing elements ordinarily may be only slightly less in diameter than the internal diameter of the confining tube and the spacing rings between the bearings may be enough smaller in diameter than the bearings, so as to be clear of the tubing in the straight portions or in the more widely curved portions of the tubing.

Figs. 2 and 3 show how the lenticular or adjoining ring type of spacer may be modified and carried out in the form of a continuous closely coiled helical spring 12. The convolutions of these springs will roll and slide one over the other, after the manner of the rings or buttons illustrated in Fig. 1, and they have the advantage of all being formed in one continuous piece, for the spacing required between any two adjoining bearings.

The ends of these spacing springs may be flared out somewhat as indicated at 13, Fig. 2, and engaged over the conical end portions of the bearings, thus to relatively center such elements and further to distribute the thrust load over a plurality of spring convolutions in engagement with the end surfaces of the bearing elements.

For carrying particularly heavy thrust loads, the structure of Fig. 3 may be preferred, where the spring ends are centered by engagement over the substantially cylindrical end hubs 11, of the bearing elements and the end convolutions are in abutting engagement with the abrupt end shoulders 10, of the bearings.

In all forms of the invention, the flexible connection is capable of transmitting pull and thrust and of freely carrying such loads around sharper curves than possible in other transmissions now available. Furthermore, in all such movements, there is no pinching or shearing action on the cable and hence the control will operate indefinitely under the most severe conditions.

All forms of the invention can be produced at low cost. The parts are easily assembled and can be readily installed and set up under proper tension and compression.

What is claimed is:

A flexible push-pill control, comprising in combination, a rigid guide tube, a tension cable operating therein, bearings in spaced relation on said cable and in free sliding engagement with the confining walls of said guide tube, lenticular spacing elements on said cable between said bearings and of smaller diameter than said bearings, said elements comprising the contacting adjoining convolutions of coiled springs loosely engaged on the cable between said bearings and in abutting engagement with said bearings at their ends and said bearings having conical end portions entered in the ends of said coiled springs and the ends of said springs being flared and thereby fitting concentrically over the conical end portions of said bearings.

GEORGE A. GILLEN.